US007478236B2

(12) United States Patent
Roh et al.

(10) Patent No.: US 7,478,236 B2
(45) Date of Patent: Jan. 13, 2009

(54) METHOD OF VALIDATING CERTIFICATE BY CERTIFICATE VALIDATION SERVER USING CERTIFICATE POLICIES AND CERTIFICATE POLICY MAPPING IN PUBLIC KEY INFRASTRUCTURE

(75) Inventors: Jong Hyuk Roh, Daejeon (KR); Young Seob Cho, Daejeon (KR); Sang Rae Cho, Seoul (KR); Dae Seon Choi, Daejeon (KR); Tae Sung Kim, Daejeon (KR); Hee Sun Kim, Daejeon (KR); Seung Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 790 days.

(21) Appl. No.: 10/442,811

(22) Filed: May 21, 2003

(65) Prior Publication Data
US 2004/0030888 A1 Feb. 12, 2004

(30) Foreign Application Priority Data
Aug. 8, 2002 (KR) .................. 10-2002-0046693

(51) Int. Cl.
*H04L 9/32* (2006.01)
*H04L 9/00* (2006.01)
(52) U.S. Cl. ..................................... 713/157; 726/10
(58) Field of Classification Search ......... 713/155–157, 713/175, 168; 726/5, 10
See application file for complete search history.

(56) References Cited

U.S. PATENT DOCUMENTS 6,028,938 A * 2/2000 Malkin et al. ............... 713/176
6,085,320 A * 7/2000 Kaliski, Jr. .................. 713/168
6,134,550 A * 10/2000 Van Oorschot et al. ......... 707/9

(Continued)

FOREIGN PATENT DOCUMENTS

| EP | 1185027 A2 * | 3/2002 |
| KR | 1020010008042 | 2/2001 |
| WO | WO 9952242 A1 * | 10/1999 |

OTHER PUBLICATIONS

ITU-T Recommendation X.509 (1997 E): Information Technology—Open Systems Interconnection—The Directory: Authentication Framework, Aug. 1997.*

(Continued)

*Primary Examiner*—Emmanuel L. Moise
*Assistant Examiner*—Zachary A Davis
(74) *Attorney, Agent, or Firm*—Blakely, Sokoloff, Taylor & Zafman LLP

(57) ABSTRACT

The present invention provides a method of validating a certificate by a certificate validation server using certificate policy and certificate policy mapping in a public key infrastructure (PKI). If the certificate validation server receives, from a client, an object certificate to be validated, a certificate of a certification authority which the client trusts, and a certificate policy which will be applied to validation of the object certificate, and receives a request for validation of the object certificate, the certificate validation server creates a certification path for the object certificate in response to the request. The certificate validation server validates the created certification path using a certificate policy mapping table if the validation of the object certificate is allowed, and then transmits a result message to the client according to the result of the validation of the certification path.

4 Claims, 3 Drawing Sheets

U.S. PATENT DOCUMENTS

| | | | |
|---|---|---|---|
| 6,189,098 B1 * | 2/2001 | Kaliski, Jr. | 713/168 |
| 6,202,157 B1 * | 3/2001 | Brownlie et al. | 726/1 |
| 6,216,231 B1 * | 4/2001 | Stubblebine | 726/10 |
| 6,223,291 B1 * | 4/2001 | Puhl et al. | 726/28 |
| 6,611,869 B1 * | 8/2003 | Eschelbeck et al. | 709/228 |
| 6,715,073 B1 * | 3/2004 | An et al. | 713/156 |
| 7,114,070 B1 * | 9/2006 | Willming et al. | 713/156 |
| 7,152,158 B2 * | 12/2006 | Watanabe et al. | 713/156 |
| 2002/0004900 A1 * | 1/2002 | Patel | 713/155 |
| 2003/0070070 A1 * | 4/2003 | Yeager et al. | 713/157 |
| 2003/0167392 A1 * | 9/2003 | Fransdonk | 713/156 |
| 2004/0193885 A1 * | 9/2004 | Fisk et al. | 713/175 |
| 2004/0255115 A1 * | 12/2004 | DeMello et al. | 713/156 |
| 2005/0114666 A1 * | 5/2005 | Sudia | 713/175 |
| 2006/0020783 A1 * | 1/2006 | Fisher | 713/156 |

OTHER PUBLICATIONS

Housley et al. Request for Comments 2459. "Internet X.509 Public Key Infrastructure Certificate and CRL Profile". Jan. 1999.*

"Efficient Certificate Status Handling within PKIs: an Application to Public Administration to Public Administration Services", M. Prandini, DEIS, 6 pages.

* cited by examiner

METHOD OF VALIDATING CERTIFICATE BY CERTIFICATE VALIDATION SERVER USING CERTIFICATE POLICIES AND CERTIFICATE POLICY MAPPING IN PUBLIC KEY INFRASTRUCTURE

BACKGROUND OF THE INVENTION

1. Field of the Invention

The present invention relates generally to a method of validating a certificate in a public key infrastructure, and more particularly to a method of validating a certificate by a certificate validation server using certificate policies and certificate policy mapping in a public key infrastructure, in which a certificate validation server is constructed in a public key infrastructure to validate a certificate and the certificate is validated using a certificate policy table and a certificate policy mapping table in the certificate validation server.

2. Description of the Prior Art

As the use of the Internet increases and various communication networks are developed, electronic commerce has been rapidly increased, and various transactions have been performed through the Internet and communication networks. However, in a communication network, such as the Internet, a security risk exists due to the risk of leakage of personal information. For example, if the personal information is compromised, a user can suffer serious consequence. Therefore, there is an increased importance of certification and security technologies for increasing security to enable related electronic commerce transactions to be safely and reliably performed between a service provider who provides an electronic commerce service and a user who uses the electronic commerce service.

Currently, for certification and security methods, there are several methods of using a user identification (ID) and a password, physical media, or biometric recognition through fingerprints, handwriting or the like. However, these methods are problematic in that they perform only certification or simply provide limited security, so they cannot perfectly provide sufficient certifications and securities for electronic commerce. For this reason, a public key infrastructure (PKI) is proposed as a standard. In such a PKI scheme, a PKI is constructed such that a reliable certification authority identifies a user and then issues a public key certificate to the user, and the user or opposite user carries out the affixture of an electronic signature and encryption using his personal key or the public key certificate which are kept safe, thus sufficiently solving problems related to certification, integrity and secrecy.

In the PKI, a user performs the validation of a certificate of an opposite party so as to use a public key of the opposite party. In order to validate the certificate, a certification path is first created, and the validation of the created certification path is performed. In this case, the certification path means a certificate chain ranging from a certificate at a trust point which a validator trusts to a certificate which is an object to be validated. That is, a subject of a higher certificate becomes an issuer of a lower certificate, and a last certificate of the certificate chain becomes an object to be validated. The validation of the certification path is a procedure of validating the validities of all certificates on the certification path. Through such certification path validation, the certificate of an opposite party can be verified.

FIG. 1 shows an example of a typical certification path in a PKI domain. The certification path is described with reference to FIG. 1. A validator "A" 10 creates a certificate chain ranging from a certificate of a certification authority (first certification authority) 11, which the validator "A" 10 trusts, to a certificate of a user "B" 14, and validates the certificate chain so as to validate the certificate of the user "B" 14. In this case, the certification path is extended from the first certification authority's certificate to the user "B"'s certificate through a second certification authority's certificate and a third certification authority's certificate.

Currently, a certification path validation procedure in the PKI is defined in the Internet Engineering Task Force (IETF), which manages standards of the Internet technologies, and is based on chapter 12.4.3 of Request For Command (RFC) 2459.

The certification path validation procedure is to validate an identity of a subject, a public key of the subject, and a binding between the attributes of the subject in an object certificate. The certification path must begin at a certificate at a trust point which the validator trusts. Further, in order to validate the certification path, the following requirements must be satisfied.

First, a first certificate on the certification path must be issued by a trusted certification authority. Second, a last certificate must be an object certificate to be validated. Third, the names of an issuer and a subject must form a chain. That is, in all certificates excepting the first and last certificates, a subject of a higher certificate must be an issuer of a next certificate. Fourth, all certificates on the certification path must be valid at the time of validation.

However, the above requirements are only necessary conditions, so basic constraints, name constraints, policy constraints, etc. must be considered to fully validate the certification path.

In the prior art, a client itself performs certificate validation in a PKI. When a second client validates a certificate of a first client in the PKI, certificates of a plurality of certification authorities may exist between a certificate of a certification authority, which the second client trusts, and a certificate of the first client which is an object to be validated. In order to validate the certificate of the first client, the second client must construct a connecting relationship from the certificate of the trusted certification authority to the certificate of the first client to be validated through the certificates of the plural certification authorities, that is, a certification path.

The second client constructs the certification path depending on various trust models. The second client must include certification path constructing modules based on the various trust models in order to construct the certification path. Further, the second client must include module that can construct a certification path on the basis of trust models of other domains in order to compatibly use certificates with other domains. Further, the second client must include modules capable of obtaining certificates of respective domains required to construct the certification path. All modules mentioned above must be installed in the second client.

Further, in the prior art, since the second client performs the certificate validation, it is very difficult or impossible to validate a certificate of another domain in a PKI with a complicated structure comprised of a plurality of certification authorities. Further, when a certificate of another domain is validated, it is difficult to acquire a certificate policy of the domain. Moreover, it is impossible to manage certificate policy mapping between the domain including the second client and another domain, so a problem is caused in using of the policy mapping when a certificate is validated.

Meanwhile, Korean Pat. Appl. No. 2000-65370 filed by Korea Telecom discloses a "System for providing a certification identification service using duplicate electronic signatures" that may be used to provide a transmitter certification service in a PKI under a wireless environment. The system, which provides an end-to-end message security service and a public key based transmitter certification service, provides a certification identification service using duplicate electronic signatures to handle a certificate validating task which is difficult to perform using a wireless terminal with a limited capacity. However, the system is operated only under a wireless environment, and provides only a simple certificate validating function which emphasizes a validity inspection of a certificate under the wireless environment. Therefore, the system does not provide efficiency for certificate validation and does not improve certificate policy management in an overall public key infrastructure.

SUMMARY OF THE INVENTION

The present invention provides a method of validating a certificate by a certificate validation server using certificate policies and certificate policy mapping in a public key infrastructure, in which a certificate validation server is constructed to perform certificate validation which was performed by a client in the prior art, and certificate policies are managed and certificates are compatibly used between different domains with the aid of a certificate policy storage device and a certificate policy mapping storage device in the certificate validation server at the time of validation.

The present invention provides A method of validating a certificate by a certificate validation server using certificate policies and certificate policy mapping in a public key infrastructure, comprising the steps of: 1) allowing a certificate validation server to receive, from a client, an object certificate to be validated, a certificate of a certification authority which the client trusts, and a certificate policy which will be applied to validation of the object certificate, and allowing the certificate validation server to receive a request for validation of the object certificate; 2) allowing the certificate validation server to create a certification path for the object certificate in response to the request of the validation; 3) allowing the certificate validation server to determine whether the validation of the object certificate is allowed or denied using a certificate policy table with respect to the created certification path and the certificate policy; 4) allowing the certificate validation server to validate the created certification path using a certificate policy mapping table if the validation of the object certificate is allowed; and 5) allowing the certificate validation server to transmit a success message to the client if a validation result of the certification path is a success, or allowing the certificate validation server to transmit a failure message to the client if the validation result of the certification path is a failure. In the present invention, the certificate policy mapping table is designed such that certificate policies of different domains are mapped to each other using the certificate policy mapping table in the public key infrastructure, thereby enabling certificates to be compatibly used between different domains. In this case, the certificate policy mapping table is used to provide certificates with compatibility between different domains, and may not be necessary in the same domain.

Further, in the step 1) of the present invention, the client may selectively provide the certificate of the certificate authority which the client trusts, and a certificate policy which will be applied to the object certificate to the certificate validation server. In this case, if the client does not provide the certificate of the certification authority the client trusts, the certificate validation server generates a certification path ranging from a certificate of a certification authority which the certificate validation server trusts to the object certificate to be validated. If the client provides the certificate of the certification authority the client trusts, the certificate validation server generates a certification path ranging from the certificate of the certification authority the client trusts to the object certificate to be validated.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
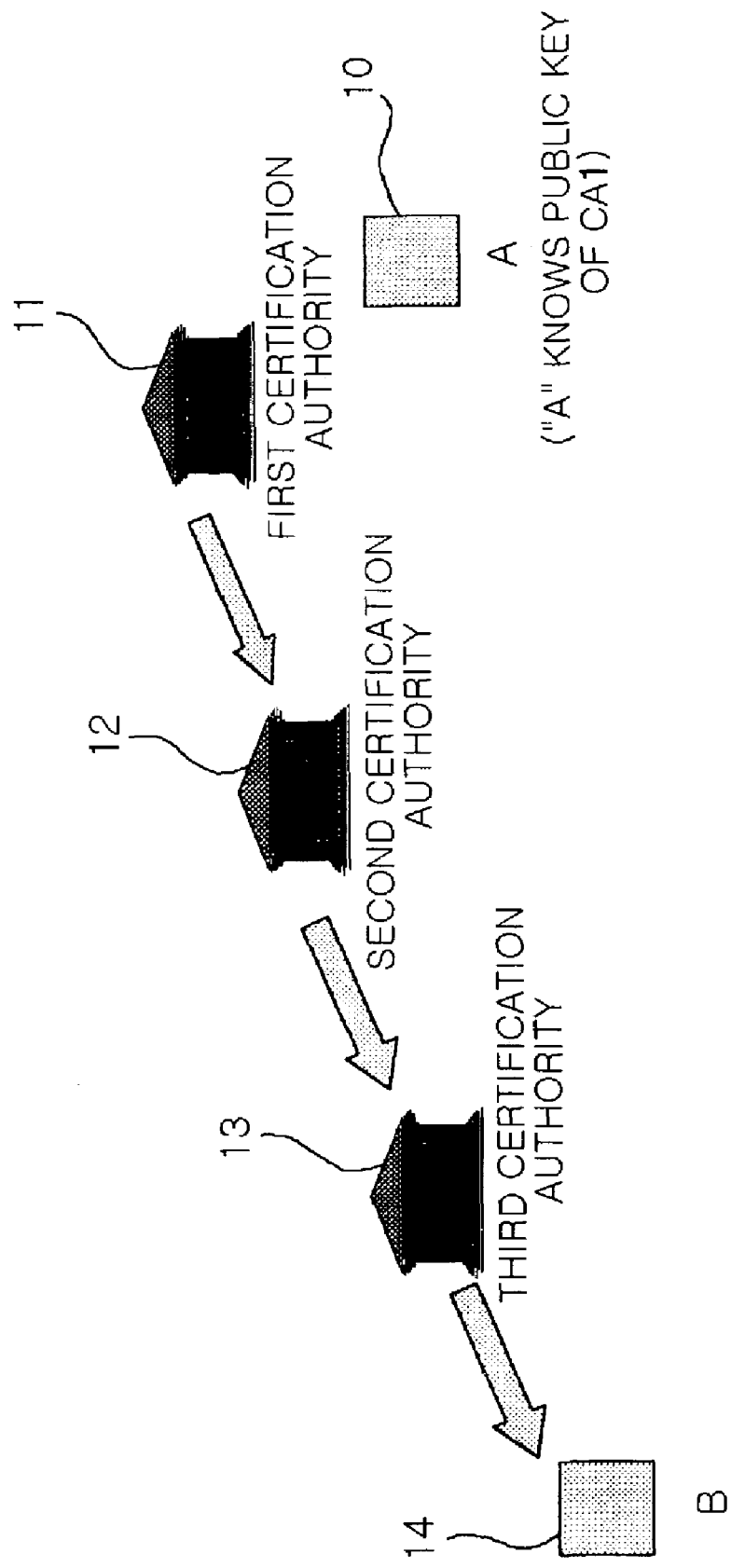
FIG. 1 is a view showing an example of a typical certification path in a public key infrastructure (PKI) domain.
Figure 2:
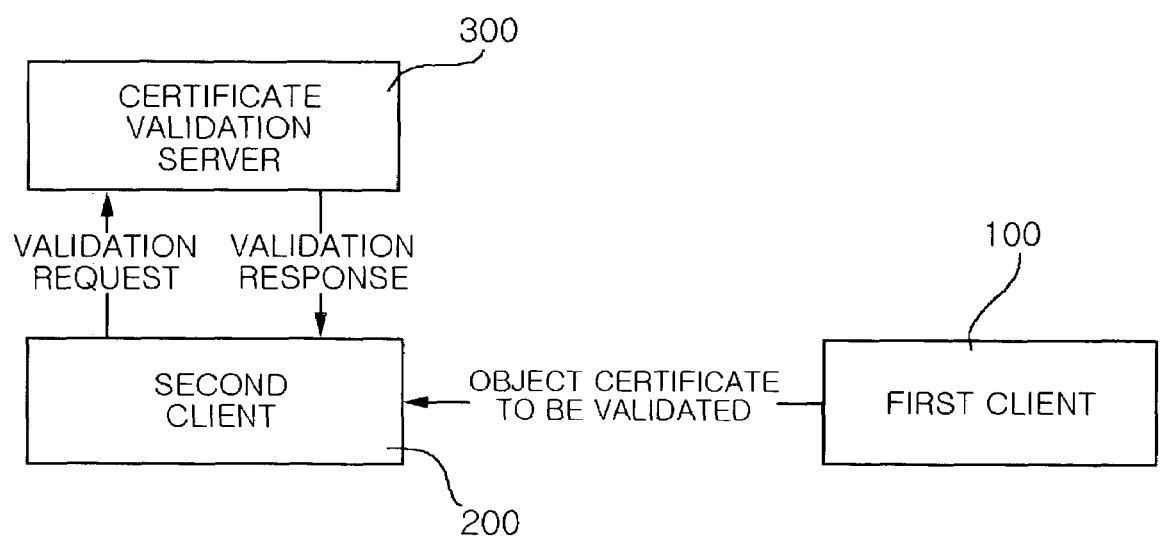
FIG. 2 is a block diagram of a system for performing certificate validation using a certificate validation server according to the present invention.

FIG. 2 is a block diagram of a system for performing certificate validation using a certificate validation server according to the present invention. As shown in FIG. 2, the system for performing certificate validation of the present invention comprises a first client 100, a second client 200 and a certificate validation server 300. The first client 100 is a subject of an object certificate to be validated. The second client 200 receives the object certificate to be validated, and requests the certificate validation server 300 to validate the object certificate. The certificate validation server 300 receives the object certificate to be validated from the second client 200, and creates a certification path to validate the object certificate.

After receiving the object certificate to be validated from the first client 100, the second client 200 requests the certificate validation server 300 to validate the object certificate so as to validate the object certificate. The certificate validation server 300 performs certificate validation according to the validation request from the second client 200 and provides validated results to the second client 200.

Meanwhile, the first and second clients 100 and 200 have certificates of certification authorities (CA), which they trust, respectively, and include certificate policies which will be applied to the object certificate. Therefore, there may be certificates of a plurality of certification authorities between the certificate of the second client 200 and the object certificate of the first client 100 to be validated. Certificate policies are one of important data required in mutual certification, and are disclosed data used to determine whether a certificate is applicable to a specific application. The second client 200 provides the object certificate of the first client 100 to the certificate validation server 300 to request the certificate validation server 300 to validate the object certificate. At this time, the second client 200 must transmit the object certificate to be validated to the certificate validation server 300, and selectively transmits a certificate of a certification authority which the second client 200 trusts, and a certificate policy which will be applied to the object certificate to the certificate validation server 300. If the certificate validation server 300 receives the certificate of the certification authority that the second client 200 trusts, from the second client 200, the certificate validation server 300 creates a certification path ranging from the certificate of the certification authority to the object certificate to be validated. However, if the certificate validation server 300 does not receive the certificate of the certification authority the second client 200 trusts from the second client 200, the certificate validation server 300 creates a certification path ranging from a certificate of a certification authority, which the certificate validation server 300 trusts, to the object certificate to be validated.

Therefore, as described above, the certificate validation server 300 creates the certification path using the object certificate of the first client 100, received from the second client 200, and the certificate of the certification authority the second client 200 trusts or the certificate of the certification authority the certificate validation server 300 trusts.

The certificate validation server 300 constructs a certificate policy table and a certificate policy mapping table therein to manage certificate policies and certificate policy mapping. The certificate policy management is a reference for determining whether the policy provided by the second client 200 which requests the certificate validation from the certificate validation server 300 is allowable. If the second client 200 does not provide the certificate policy that will be used in the validation of the object certificate to the certificate validation server 300, the certificate validation server 300 may perform the certificate validation by personally selecting an appropriate certificate policy. Further, the certificate policy mapping is achieved by mapping one certificate policy of one certification authority to another certificate policy of another certification authority among two or more certification authorities (CA). That is, the certificate policy mapping is used to map certificate policies of at least two certification authorities to each other so as to use a certificate issued by a certification authority of an external PKI domain in a PKI domain including a corresponding certification authority. In a PKI, several domains may exist, and each of the domains has a unique policy. As described above, mapping of certificate policies is required for compatible use of certificates to allow certificates of other domains to be used in a corresponding domain. For example, if a certificate policy of a domain "A" is "a", and a certificate policy of a domain "B" is "b", a user issued with a certificate of the domain "A" signs an arbitrary document with the issued certificate, and sends the document to a user of the domain "B". The user of the domain "B" validates the certificate of the user of the domain "A" so as to validate the signature. At this time, if the user the domain "B" knows the policy "b" of the domain "B", and trusts a certification authority in the domain "B" (most cases correspond to this case), a certification path is created to range from the certificate of the certification authority of the domain "B" to the user the domain "A". At this time, the certification path is validated using the policy "b" of the domain "B". The certificate policy mapping table preferably contain certificate policies of clients, used in all domains. As described above, when certificates are compatibly used between domains, policies can be reflected on the validation of a certificate on the basis of the certificate policy mapping table even between a subject and an issuer using different PKI domains. As described above, the certificate policy mapping table is used to provide the certificates with compatibility between different domains, and is not necessary in the same domain.

In the certificate policy table, allowance policies and denial policies are separately managed. The allowance and denial policies are references required when the certificate validation server 300 allows or denies the validation of the object certificate of the first client 100, received from the second client 200. Therefore, the certificate validation server 300 determines whether to allow or deny the validation of the object certificate using the certificate policy table with respect to the certification path generated in the certificate validation server 300 and the certificate policy selectively transmitted from the second client 200. In detail, the certificate validation server 300 determines whether the validation of the object certificate is allowed or denied according to the allowance policies or the denial policies of the certificate policy table. If the validation of the object certificate is allowed, the certificate validation server 300 performs the validation of the object certificate by validating the certification path using the certificate policy mapping table. In this case, the certificate policy mapping may be transmitted to the certificate validation server 300 from the second client 200, while being included in the object certificate. As described above, the certificate validation server 300 manages certificate policies, thereby enabling certificate policies to be centrally managed.

Figure 3:
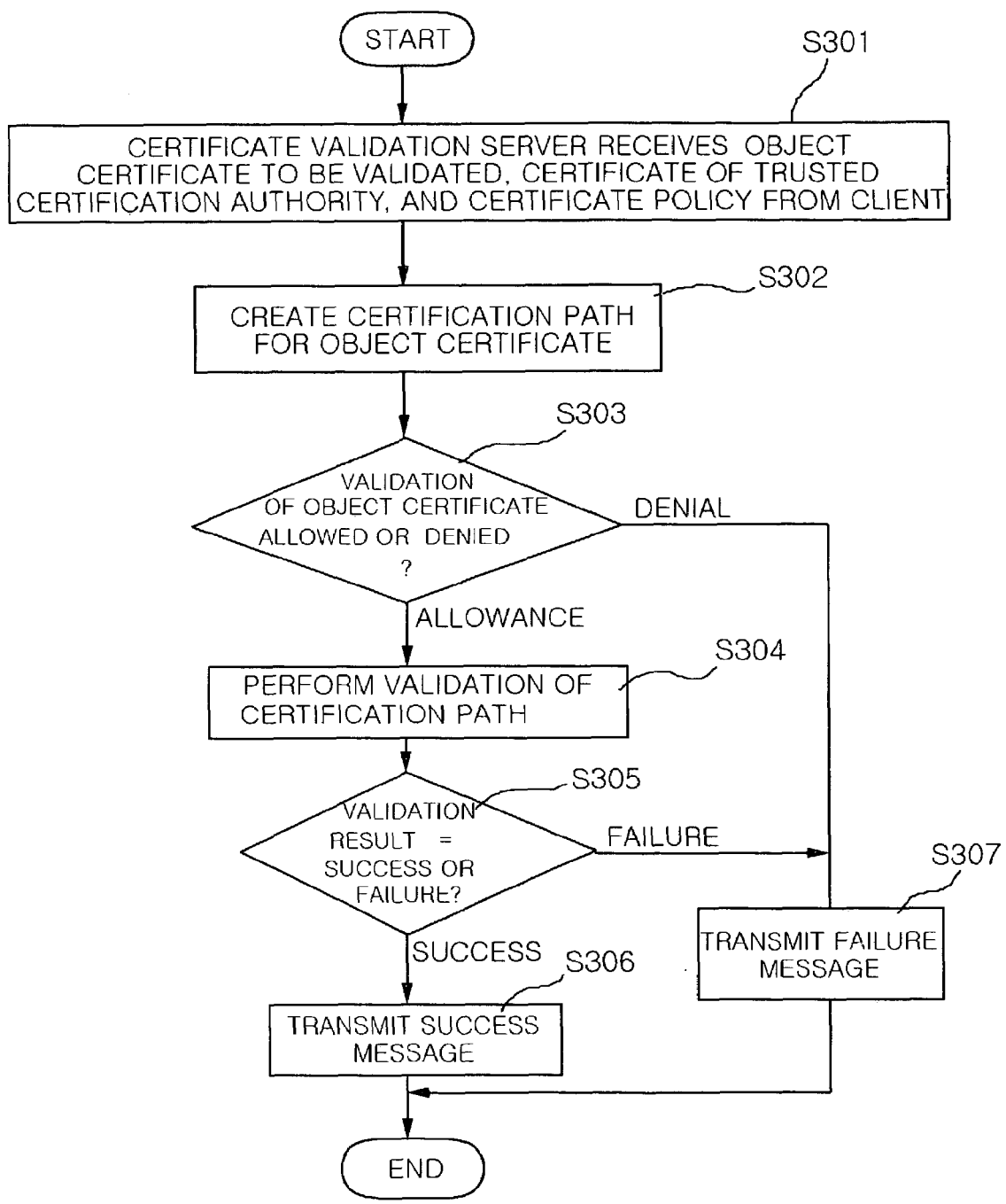
FIG. 3 is a flowchart of a method of validating a certificate by the certificate validation server if a client requests the certificate validation server to validate the certificate.

The process for performing the validation of the object certificate by the certificate validation server 300 is described in detail with reference to FIG. 3. FIG. 3 is a flowchart of a method of validating a certificate by the certificate validation server if a client requests the certificate validation server to validate the certificate. Especially, FIG. 3 shows a process for performing certificate validation using the certificate policy table and the certificate policy mapping table at the time of validation. For these operations, the certificate validation server 300 of the present invention manages the certificate policy table and the certificate policy mapping table as database tables, shares and manages certificate policies using the certificate policy mapping table, and carries out mapping of certificate policies of respective certification authorities in different PKI domains to each other, thereby enabling certificates to be compatibly used between different domains.

Hereinafter, a process for performing the validation of the object certificate using the certificate policies and the certificate policy mapping is described with reference to FIG. 3. The certificate validation server 300 receives the object certificate to be validated from the second client 200 at step S301. In this case, the certificate validation server 300 performs the validation of the object certificate in place of the second client 200 which had performed the validation in the prior art. Further, since the second client 200 selectively transmits the certificate of the certification authority the second client 200 trusts and the certificate policy, which will be applied to the validation of the object certificate, to the certificate validation server 300, the certificate validation server 300 receives the certificate of the trusted certification authority and the certificate policy from the second client 200 at step S301. At this time, it should be noted that, when the second client 200 requests the certificate validation server 300 to validate the object certificate, the second client 200 must transmit the object certificate to be validated to the certificate validation server 300, but it selectively transmits the certificate of the certification authority which the second client 200 trusts and the certificate policy which will be applied to the certificate validation at step S301. Thereafter, the certificate validation server 300 creates a certification path for the received object certificate at step S302. The certificate validation server 300 creates the certification path ranging from the certificate of the certification authority the second client 200 trusts to the object certificate transmitted from the second client 200. In this case, the second client 200 selectively transmits the certificate of the certification authority the second client 200 trusts to the certificate validation server 300. Therefore, if the second client 200 does not provide the certificate of the certification authority to the certificate validation server 300, the certificate validation server 300 creates a certification path ranging from a certificate of a certification authority the certificate validation server 300 trusts to the object certificate to be validated. The certificate validation server 300 determines whether the validation of the object certificate is allowed using the generated certification path, the certificate policy provided from the second client 200, and the certificate policy table managed by the certificate validation server 300 at step S303. In this case, in the certificate policy table managed by the certificate validation server 300, allowance policies and denial policies are managed, such that the certificate validation server 300 determines whether to allow or deny the validation of the object certificate according to the allowance and denial policies. If it is determined that the validation of the object certificate is not allowed at step S303, the certificate validation server 300 transmits a failure processing message to the second client 200 at step S307. On the contrary, if it is determined that the validation of the object certificate is allowed, the certificate validation server 300 validates the object certificate by performing the validation of the created certification path using the certificate policy mapping table managed in the certificate validation server 300 with respect to the created certification path and the certificate policy provided from the second client 200 at step S304. In this case, the certificate policy mapping table is used to map certificate policies of a subject and an issuer to each other, if applied domains are different, as described above. Further, the certificate policy mapping table is used to map a certificate policy in another domain to that in a corresponding domain so as to validate the certification path. However, the certificate policy mapping table may be included in the object certificate to be validated. In this case, the object certificate to be validated is transmitted to the certificate validation server 300 from the second client 200, so the certificate validation server 300 can carry out mapping of certificate polices using the certificate policy mapping table. Therefore, in the present invention, regardless of whether the certificate policy mapping table is included in the object certificate, the certificate validation server 300 validates the certification path through the compatible use of certificates between domains using the certificate policy mapping table, and validates the object certificate through the validation of the certification path. Moreover, the certificate validation server 300 uses the certificate policy mapping table, thereby enabling certificate policies to be reflected on the validation of a certificate when certificates are compatibly used between different domains. The certificate policy mapping table is used to carry out mapping when certificates in different domains are used, and is not necessary in the same domain. After step S304, the certificate validation server 300 determines whether the result of the validation of the certification path is a success or failure at step S305. If it is determined that the validation result is a success at step S305, the certificate validation server 300 generates a validation success message for the certification path and transmits the validation success message to the second client 200 at step S306. On the contrary, if it is determined that the validation result is a failure, the certificate validation server 300 generates a validation failure message for the certification path and transmits the validation failure message to the second client 200 at step S307. When the validation failure message for the certification path is generated at step S307, the certificate validation server 300 generates logs for the cause of the failure and the response thereof.

Generally, certification path validation in PKI domains must support expansibilities while maintaining respective domains under exclusive environments in which a plurality of certification authorities are managed. A plurality of certification authorities comply with various trust models, such as a hierarchical model, a mutual certification model, etc., so as to support the expansibilities thereamong. The trust models, which are schemes for determining an entire structure of a PKI, must prepare for later international communication, and require technologies for validating certification paths related to respective models. The trust models are classified into a hierarchical model, a mutual certification model, a bridge model (bridge CA), a trust list model, etc.

The present invention creates a certification path for an object certificate to be validated in PKI domains having various structures, and performs the validation of the created certification path using a certificate policy requested by a client and certificate policy mapping between different domains. In the present invention, the certificate validation is processed by the certificate validation server, not by a client, and allowance and denial policies for the certificate validation are managed, thereby enabling certificate policies in a domain to be centrally managed by the certificate validation server.

As described above, the present invention provides a method of validating a certificate by a certificate validation server, which can centrally manage certificate policies and provide certificate policy mapping between domains using a certificate policy table and a certificate policy mapping table when the certificate validation server validates a certificate in a public key infrastructure.

Further, the present invention is advantageous in that certificate validation is processed by the certificate validation server, not by a client, and allowance and denial policies for certificate validation are managed, thereby enabling certificate policies in a domain to be centrally managed by the certificate validation server. Moreover, the present invention is advantageous in that it can assign flexibility to the change of certificate policies by reflecting a policy of a changed certificate on a certificate validation algorithm of the certificate validation server, and enable certificates to be compatibly used between PKI domains by managing certificate policy mapping.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of validating a certificate by a certificate validation server using certificate policies and certificate policy mapping in a public key infrastructure in which a certification authority server issues the certificate and a client uses the certificate as an identifier, comprising the steps of:

a certificate validation server receiving, from the client, an object certificate to be validated, a certificate of a certification authority which the client trusts, and a certificate policy which will be applied to validation of the object certificate, and the certificate validation server receiving a request for validation of the object certificate;

the certificate validation server creating a certification path, which is a certificate chain ranging from the certificate of the certification authority which the client trusts to the object certificate, in response to the request for validation;

the certificate validation server determining whether the validation of the object certificate is allowed or denied using a certificate policy table with respect to the created certification path and the certificate policy, wherein the certificate policy table is managed by the certificate validation server;

if the validation of the object certificate is allowed, the certificate validation server validating all certificates of the created certification path using a certificate policy mapping table, wherein the certificate policy mapping table is managed by the certificate validation server; and if a validation result of the certification path is a success, the certificate validation server transmitting a success message to the client;

otherwise if the validation result of the certification path is a failure or if the validation of the object certificate is denied, the certificate validation server transmitting a failure message to the client.

2. The method according to claim 1, wherein the certificate policy table is designed such that allowance policies and denial policies for certificate validation are separately managed.

3. The method according to claim 1, wherein the certificate policy mapping table is designed such that certificate policies of different domains are mapped to each other using the certificate policy mapping table in the public key infrastructure, thereby enabling certificates to be compatibly used between the different domains.

4. A method of validating a certificate by a certificate validation server using certificate policies and certificate policy mapping in a public key infrastructure in which a certification authority server issues the certificate and a client uses the certificate as an identifier, comprising the steps of:

a certificate validation server receiving, from the client, an object certificate to be validated, a certificate of a certification authority which the client trusts, and a certificate policy which will be applied to validation of the object certificate, and the certificate validation server receiving a request for validation of the object certificate;

the certificate validation server creating a certification path, which is a certificate chain ranging from the certificate of the certification authority which the client trusts to the object certificate, in response to the request for validation;

the certificate validation server determining whether the validation of the object certificate is allowed or denied using a certificate policy table with respect to the created certification path and the certificate policy, wherein the certificate policy table (i) is managed by the certificate validation server and (ii) is designed such that allowance policies and denial policies for certificate validation are separately managed;

if the validation of the object certificate is allowed, the certificate validation server validating certificates of the created certification path using a certificate policy mapping table, wherein the certificate policy mapping table (i) is managed by the certificate validation server and (ii) is designed such that certificate policies of different domains are mapped to each other using the certificate policy mapping table in the public key infrastructure, thereby enabling certificates to be compatibly used between the different domains; and if a validation result of the certification path is a success, the certificate validation server transmitting a success message to the client;

otherwise if the validation result of the certification path is a failure or if the validation of the object certificate is denied, the certificate validation server transmitting a failure message to the client.

\* \* \* \* \*